United States Patent [19]
Rucker et al.

[11] 3,728,354
[45] Apr. 17, 1973

[54] 2-PERCHLOROCROTONYLAMINO-5-TRIFLUOROMETHYL-1,3,4-THIADIAZOLE

[75] Inventors: Dietrich Rucker, Wuppertal-Elberfeld; Ludwig Eue, Cologne-Stammheim; Helmuth Hack, Cologne-Buchheim, all of Germany

[73] Assignee: Farbenfabriken Bayer Aktiengesellschaft, Leverkusen, Germany

[22] Filed: July 16, 1969

[21] Appl. No.: 842,369

[30] Foreign Application Priority Data

Aug. 1, 1968 Germany..................P 17 95 037.7

[52] U.S. Cl..............................260/306.8 D, 71/90
[51] Int. Cl.............................................C07d 91/62
[58] Field of Search..............................260/306.8 D

[56] References Cited

UNITED STATES PATENTS 3,564,002    2/1971    Remers et al...................260/306.8

OTHER PUBLICATIONS

Lalezari et al., J. Heterocyclic Chem., 3(3), 336–337 (1966).

*Primary Examiner*—Alex Mazel
*Assistant Examiner*—R. J. Gallagher
*Attorney*—Burgess, Dinklage & Sprung

[57] ABSTRACT

2-(N-acyl)-amino-1,3,4-thiadiazoles, i.e. 2-[N-(optionally alkyl)-N-(alkanoyl, chloroalkanoyl, fluoroalkanoyl, alkenoyl, chloroalkenoyl, alkoxycarbonyl, alkoxyalkoxycarbonyl, alkenyloxycarbonyl, alkynyloxycarbonyl, and phenoxycarbonyl)-amino]-5-trifluoromethyl-1,3,4-thiadiazoles, which possess herbicidal properties, and which may be produced by conventional methods.

1 Claim, No Drawings

.# 2-PERCHLOROCROTONYLAMINO-5-TRIFLUOROMETHYL-1,3,4-THIADIAZOLE

The present invention relates to and has for its objects the provision for particular new 2-(N-acyl)-amino-1,3,4-thiadiazoles, i.e. 2-[N-(optionally alkyl)-N-(alkanoyl, chloroalkanoyl, fluoroalkanoyl, alkenoyl, chloroalkenoyl, alkoxycarbonyl, alkoxyalkoxycarbonyl, alkenyloxycarbonyl, alkynyloxycarbonyl, and phenoxycarbonyl)-amino]-5-trifluoromethyl-1,3,4-thiadiazoles, which posses valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that carboxylic acid amides such as propionic acid 3,4-dichloroanilide (A) [German Published Patent Specification No. 1,039,779] and carbamates such as isopropyl-N-(3-chloro-phenyl)-carbamate (B) [U.S. Pat. No. 2,734,911] can be used as herbicides.

It has now been found, in accordance with the present invention, that the particular new 2-(N-acyl)-amino-1,3,4-thiadiazoles of the formula:

$$R-\underset{S}{\underset{\|}{\overset{N-N}{\|}}}-\underset{\underset{CO-R''}{|}}{N}-R' \qquad (I)$$

in which
R is trifluoromethyl,
R' is hydrogen or alkyl of one to four carbon atoms, and R'' is alkyl of one to five carbon atoms, chloro-substituted alkyl of one to three carbon atoms, fluoro-substituted alkyl of one to three carbon atoms, alkenyl of two to four carbon atoms, chloro-substituted alkenyl of two to four carbon atoms, alkoxy of one to four carbon atoms, alkoxyalkoxy having one to two carbon atoms in each corresponding alkoxy moiety, alkenyloxy of two to four carbon atoms, alkynyloxy of three carbon atoms, or phenoxy, exhibit strong herbicidal, in particular selective herbicidal, properties.

It has been furthermore found, in accordance with the present invention, that a process for the production of the particular new compounds of formula (I) above may be provided, which comprises a. reacting a 2-amino-1,3,4-thiadiazole of the formula:

$$R-\underset{S}{\underset{\|}{\overset{N-N}{\|}}}-\underset{\underset{NH}{|}}{N}-R' \qquad (II)$$

in which
R and R' are the same as defined above, in the presence of an acid-binding agent, with a carboxylic acid halide of the formula:

$$R''-CO-Hal \qquad III$$

in which
R'' is the same as defined above, and

Hal is halogen such as chloro, bromo, fluoro or iodo, especially chloro: or
b. reacting a 2-amino-1,3,4-thiadiazole of the formula (II), with an acid anhydride of the formula:

$$\begin{array}{c} R''-C\overset{O}{\underset{\diagdown}{\|}}\\ \phantom{R''-C}O\\ R''-C\overset{\diagup}{\underset{\|}{\phantom{O}}}\\ \phantom{R''-C}O \end{array} \qquad (IV)$$

in which
R'' is the same as defined above.

It is decidedly surprising that the 2-(N-acyl)-amino-1,3,4-thiadiazoles according to the present invention exhibit a stronger herbicidal activity and, in particular, a better selective-herbicidal activity than the previously known compounds such as (A) and (B) noted above. The instant compounds therefore represent a valuable enrichment of the art.

If 2-amino-5-trifluoromethyl-1,3,4-thiadiazole and dichloroacetyl chloride are used as starting materials, the reaction course according to process variant [a] can be represented by the following reaction scheme:

$$CF_3-\underset{S}{\underset{\|}{\overset{N-N}{\|}}}-NH_2 + Cl\cdot CO\cdot CHCl_2 \xrightarrow{\text{Base}}$$

(IIa)  (IIIa)

$$CF_3-\underset{S}{\underset{\|}{\overset{N-N}{\|}}}-NH\cdot CO\cdot CHCl_2$$

(1₁)

If propionic anhydride is used for the reaction with the same thiadiazole, the reaction course of the process variant [b] can be represented by the following reaction scheme:

$$CF_3-\underset{S}{\underset{\|}{\overset{N-N}{\|}}}-NH_2 + \begin{array}{c} O\overset{\diagdown}{\underset{\|}{\phantom{O}}}\\ \phantom{O}C-CH_2\cdot CH_3\\ O\overset{\diagup}{\underset{\|}{\phantom{O}}}\\ \phantom{O}C-CH_2\cdot CH_3\\ O \end{array} \longrightarrow$$

(IIa)  (IVa)

$$CF_3-\underset{S}{\underset{\|}{\overset{N-N}{\|}}}-NH\cdot CO\cdot C_2H_5$$

(2₁)

Advantageously, in accordance with the present invention, in the various formulae herein:
R represents trifluoromethyl;
R' represents hydrogen; or
straight and branched chin lower alkyl hydrocarbon of one to four carbon atoms such as methyl, ethyl, n- and iso-propyl, n-, iso-, sec.- and tert.-butyl, and the like, especially $C_{1-3}$ or $C_{1-2}$ alkyl, and more especially methyl; and
R'' represents straight and branched chain lower alkyl hydrocarbon of one to five carbon atoms such as methyl to tert.-butyl inclusive, as defined above, amyl, isoamyl, and the like, especially $C_{1-4}$ or $C_{1-3}$ or $C_{1-2}$ alkyl;
chloro-substituted lower alkyl of one to three carbon atoms such as mono, di and tri chloro- -methyl, ethyl, n- and isopropyl, and the like, especially mono, di and tri chloro-$C_{1-2}$ alkyl, and more especially di and tri chloro-methyl;

fluoro-substituted lower alkyl of one to three carbon atoms such as mono, di and tri chloro- -methyl, ethyl, n- and isopropyl, and the like, especially mono, di and tri fluoro-$C_{1-2}$ alkyl, and more especially trifluoromethyl;

straight and branched chain lower alkenyl hydrocarbon of two to four carbon atoms such as vinyl, $\alpha$-, $\beta$ and $\gamma$- allyl (i.e. prop-2-enyl, 1-methyl-vinyl and prop-1-enyl), but-1,2 and 3-enyl, 1-methyl-prop-1 and 2-enyl, and 2-methyl-prop-1 and 2-enyl, and the like, especially $C_3$ alkenyl, and more especially 1-methyl-vinyl;

chloro-substituted lower alkenyl of two to four carbon atoms such as mono to penta chloro -vinyl,$\alpha$-, $\beta$, and $\gamma$-allyl, but-1,2, and 3-enyl, 1-methyl-prop-1 and 2-enyl, and 2-methyl-prop-1 and 2-enyl, and the like, especially chloro-substituted $C_3$ alkenyl, more especially pentachloro-$C_3$ alkenyl, and particularly 1,2,3,3,3-pentachloro-prop-1-enyl;

straight and branched chain lower alkoxy of one to four carbon atoms such as methoxy, ethoxy, n- and iso-propoxy, n-, iso-, sec.- and tert.-butoxy, and the like, especially $C_{1-3}$ or $C_{1-2}$ alkoxy;

lower alkoxy-substituted lower alkoxy having 1-2 carbon atoms in each corresponding alkoxy moiety such as methoxy and ethoxy substituted methoxy and ethoxy, and the like, i.e. $C_{1-2}$ alkoxy-$C_{1-2}$ alkoxy, especially $\beta$-methoxy-ethoxy;

straight and branched chain lower alkenyloxy of two to four carbon atoms such as vinyloxy, $\alpha$-, $\beta$- and $\gamma$- allyloxy (i.e. prop-2-enyloxy, 1-methyl-vinyloxy and prop-1-enyloxy), but-1,2 and 3-enyloxy, 1-methyl-prop- 1 and 2-enyloxy, and 2-methyl-prop- 1 and 2-enyloxy, and the like, especially $C_3$ alkenyloxy, and more especially prop-2-enyloxy;

alkynyloxy of three carbon atoms such as prop-1 and 2-ynyloxy, and the like, especially prop-2-ynyloxy; or phenoxy.

Preferably, R is trifluoromethyl; R' is hydrogen; or $C_{1-4}$ or $C_{1-2}$ alkyl, especially methyl; and R'' is $C_{1-5}$ alkyl; di and tri chloro-methyl; trifluoromethyl; $C_3$ alkenyl; pentachloro-$C_3$ alkenyl; $C_{1-4}$ alkoxy, $\beta$-methoxy-ethoxy; $C_3$ alkenyloxy; $C_3$ alkynyloxy; or phenoxy.

In particular, R is trifluoromethyl; R' is hydrogen; and R'' is $C_{1-4}$ alkyl; dichloromethyl; or $C_{1-4}$ alkoxy.

The 2-amino-1,3,4-thiadiazoles of formula (II) above required as starting materials are, in part, known from the literature. Such compounds can be prepared, for example, by reaction of the appropriate 1-acyl-thiosemicarbazides with agents which split off water, such as acetic anhydride [Chemische Berichte 29, 2511 (1896)]. The new starting 2-amino-1,3,4-thiadiazole compounds can be prepared in the same manner.

The carboxylic acid halides and anhydrides which may be used as starting materials according to the present invention are precisely defined by formulae (III) and (IV) above. These carboxylic acid halides and anhydrides are, of course, wellknown and readily available.

As examples of such starting acid halides of formula (III) which may be preferably used, there are mentioned in particular: monochloroacetyl chloride, dichloroacetyl chloride, 3-chloro-propionic acid chloride, perchloro-crotonic acid chloride, chloroformic acid methyl ester, chloroformic acid isopropyl ester, and the like.

As examples of such starting acid anhydrides of formula (IV) which may be used, propionic anhydride and trifluoro-acetic anhydride are particularly suitable.

In the following, further details for the two process variants [a] and [b] are given:

As inert solvent (which term includes a mere diluent), inert organic solvents are particularly suitable. These include hydrocarbons, such as benzene and toluene; ethers, such as diethyl ether, tetrahydrofuran and dioxan; esters, such as ethyl acetate; and nitriles, such as acetonitrile, and the like. In process variant [b], an excess of the anhydride may be expediently used as solvent.

In process variant [a], any of the customary acid-binding agents can be used. These include preferably alkali metal hydroxides, alkali metal carbonates and tertiary amines. Especially suitable acid-binding agents are sodium hydroxide, sodium carbonate, triethylamine, N,N-dimethylaniline, pyridine, and the like.

The reaction temperatures, in both process variants, can be varied within a fairly wide range. In general, the reaction is carried out at substantially between about 20°–120b$LC$, preferably between about 20°–100°C.

When carrying out the production process according to the present invention, in connection with the respective process variants, about one mol of acid halide or one to two mols of acid anhydride may be used for each mol of starting amino-thiadiazole. The working up of the reaction mixture may be effected in the customary manner.

Advantageously, the instant active compounds exhibit a strong herbicidal potency and can therefore be used as weed killers. By weeds are meant in the broadest sense all plants which grow in places where they are not desired. Whether the active compounds according to the present invention act as total or selective herbicidal agents depends on the amount applied, as the artisan will appreciate.

The active compounds according to the present invention can be used, for example, in the case of the following plants: dicotyledons, such as mustard (Sinapis), cress (Lepidium), cleaver (Galium), common chickweed (Stellaria), mayweed (Matricaria), smallflower Galinsoga (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lotlium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The active compounds according to the present invention are preferably used as selective herbicides, although they exhibit a markedly good selectivity when applied before and after emergence in cereals, such as wheat and oats. Such compounds can also be used for the control of millet species in cereals. Furthermore, these active compounds additionally can be used in cotton cultivation.

Appropriately, the instant active compounds also have only a slight toxicity to warm-blooded animals.

The instant active compounds also exhibit insecticidal, acaricidal and fungicidal properties, particularly against insects, acarids and fungi which infest plants.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hyrocarbons (e.g. chloro-benzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanol-amine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents )e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, or fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95 percent by weight, and preferably 0.5 and 90 percent by weight, of the mixture, whereas carrier composition mixtures suitable for direct application or field application generally contemplate those in which the active compound is present in an amount substantially between about 0.005-0.5 %, preferably 0.008 to 0.1 percent, by weight of the mixture. Thus, the present invention contemplates over-all compositions which comprise mixtures of a conventional dispersible carrier vehicle such as (1) as dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.005 to 95 percent, and preferably 0.008 to 95 percent, by weight of the mixture.

In particular, the amount of active compound applied per unit area varies according to the purpose intended, i.e. the effect desired, and the mode of application. In general, substantially between about 0.25–20 kg of active compound per hectare are applied, and preferably between about 1–10 kg of active compound per hectare, irrespective of the presence or absence of the carrier vehicle.

In the usual aqueous preparations, and in the case of application after emergence, the concentration of the active compound is, in general, substantially between about 0.005 to 0.5 percent, preferably 0.008 to 0.1 percent, by weight of the mixture, as aforesaid.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amount only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound or even the 100 percent active substance alone, e.g. about 20 to 100 percent by weight of the active compound.

While the active compounds can be used effectively according to the pre-emergence method, they are also particularly effective when used according to the post-emergence method.

Furthermore, the present invention contemplates methods of selectively killing, combatting or controlling undesired plants, e.g. weeds and the like, which comprise, applying to at least one of (a) such weeds and (b) their habitat, i.e. the locus to be protected, a herbicidally effective or toxic amount of the particular compound of the invention alone or together with a carrier vehicle as noted above. The instant formulations or compositions are applied in the usual manner, for example by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, e.g. for total or only selective herbicidal effect, and the plants which are to be controlled or protected. Therefore, in special cases, it is possible to go above or below the aforementioned concentration ranges and ranges of amounts per unit area.

The following Examples illustrate, without limitation, the herbicidal activity of the particular active compounds of the present invention.

given active compound. It is expedient to keep constant the amount of water per unit area. The concentration of the active compound in the given preparation is of no importance, only the amount of active compound applied per unit area being decisive. After three weeks, the degree of damage to the test plants is determined and characterized by the values 0–5, which have the following meaning:

0 no effect
1 slight damage or delay in growth
2 marked damage or inhibition of growth
3 heavy damage and only deficient development or only 50 percent emerged
4 plants partially destroyed after germination or only 25 percent emerged
5 plants completely dead or not emerged.

The particular active compounds tested, the amounts applied and the results obtained can be seen from the following Tables 1a and 1b:

TABLE 1a.—PRE-EMERGENCE TEST

| Active compound | Amount of active compound applied in kg./hectare | Cheno-podium | Sinapis | Cotton | Oats | Wheat |
|---|---|---|---|---|---|---|
| (B) 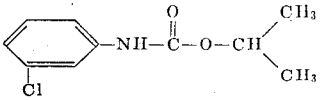 (Known,) | 20 | 4 | 5 | 2 | 5 | 5 |
|  | 10 | 4 | 5 | 1–2 | 4–5 | 5 |
|  | 5 | 3 | 4 | 1 | 4 | 4–5 |
| (3₁) | 20 | 5 | 5 | 5 | 3 | 2 |
|  | 10 | 5 | 5 | 4–5 | 1 | 1 |
|  | 5 | 5 | 5 | 4–5 | 0 | 0 |

TABLE 1b.—PRE-EMERGENCE TEST

| Active compound | Amount of active compound applied in kg./hectare | Echino-chloa | Cheno-podium | Sinapis | Cotton | Wheat |
|---|---|---|---|---|---|---|
| (A)  (Known.) | 20 | 2 | 1 | 4 | 0 | 1 |
|  | 10 | 1 | 0 | 2 | 0 | 0 |
|  | 5 | 0 | 0 | 0 | 0 | 0 |
| (4₁) | 20 | 5 | 5 | 5 | 5 | 5 |
|  | 10 | 5 | 5 | 5 | 5 | 4–5 |
|  | 5 | 4–5 | 5 | 5 | 4 | 4 |
| (1₂) | 20 | 4–5 | 5 | 5 | 3 | 2–3 |
|  | 10 | 3 | 5 | 5 | 1 | 1 |
|  | 5 | 2 | 5 | 5 | 0 | 0 |

EXAMPLE 1

Pre-emergence test
  Solvent: 5 parts by weight acetone
  Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Seeds of the test plants are sown in normal soil and, after 24 hours, watered with the preparation of the

EXAMPLE 2

Post-emergence test
  Solvent: 5 parts by weight acetone
  Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Test plants which have a height of about 5 to 15 cm. are sprayed with the preparation of the given active compound until just dew moist. After three weeks, the degree of damage to the plants is determined and characterized by the values 0–5, which have the following meaning:

0 no effect
1 a few slightly burnt spots
2 marked damage to leaves
3 some leaves and parts of stalks partially dead
4 plant partially destroyed
5 plant completely dead.

The particular active compounds tested, their concentrations, and the results obtained can be seen from the following Table 2:

| | R | R' | R'' | m.p. °C |
|---|---|---|---|---|
| (6₁) | CF₃ | H | C(Cl)=C(Cl)—CCl₃ | 95 |
| (7₁) | CF₃ | CH₃ | CHCl₂ | 71 |
| (8₁) | CF₃ | CH₃ | CH₂·CH₃ | 73 |
| (3₁) | CF₃ | H | OCH₃ | 186 |
| (9₁) | CF₃ | H | O·CH(CH₃)₂ | 145 |
| (10₁) | CF₃ | H | O·(CH₂)₃·CH₃ | 162 |
| (11₁) | CF₃ | H | O·CH₂·CH=CH₂ | 157 |
| (12₁) | CF₃ | H | O·CH₂·C≡CH | 174 |
| (13₁) | CF₃ | H | OC₆H₅ | 190 |
| (14₁) | CF₃ | CH₃ | OCH₃ | b.p. 127/11 mm Hg |
| (15₁) | CF₃ | CH₃ | OC₆H₅ | 109 |
| (16₁) | CF₃ | H | CH₂—CH₂—CH(CH₃)₂ | 119 |
| (17₁) | CF₃ | H | C=CH₂ <br>      CH₃ | 101 |

TABLE 2.—POST-EMERGENCE TEST

| Active compound | Concentration of active compound in percent | Echinochloa | Chenopodium | Sinapis | Oats | Wheat |
|---|---|---|---|---|---|---|
| (B) 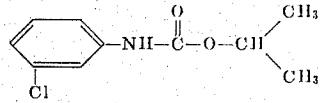 (Known.) | 0.1 <br> 0.05 <br> 0.025 | 3 <br> 2 <br> 2 | 3 <br> 2 <br> 2 | 4 <br> 3 <br> 2 | 3 <br> 2 <br> 1 | 3 <br> 1 <br> 1 |
| (A) 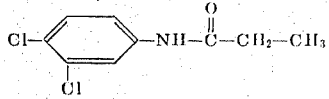 (Known.) | 0.1 <br> 0.05 <br> 0.025 | 5 <br> 5 <br> 5 | 5 <br> 5 <br> 5 | 5 <br> 5 <br> 5 | 3 <br> 3 <br> 2 | 3 <br> 2 <br> 1 |
| (3₂) | 0.1 <br> 0.05 <br> 0.025 | 4–5 <br> 4 <br> 3 | 5 <br> 5 <br> 5 | 5 <br> 5 <br> 5 | 2 <br> 1 <br> 0 | 4 <br> 1 <br> 0 |
| (4₂) | 0.1 <br> 0.05 <br> 0.025 | 4 <br> 2 <br> 0 | 5 <br> 5 <br> 4 | 5 <br> 5 <br> 5 | 3 <br> 2 <br> 1 | 4 <br> 2 <br> 2 |
| (1₃) | 0.1 <br> 0.05 <br> 0.025 | 4–5 <br> 4 <br> 2 | 5 <br> 4–5 <br> 3 | 5 <br> 5 <br> 5 | 4 <br> 3 <br> 1 | 4 <br> 3 <br> 3 |
| (2₂) | 0.1 <br> 0.05 <br> 0.025 | 5 <br> 4–5 <br> 3 | 5 <br> 5 <br> 5 | 5 <br> 5 <br> 4–5 | 4 <br> 3 <br> 0 | 3 <br> 3 <br> 2 |

The following further examples are set forth to illustrate, without limitation, the processes for producing the active compounds according to the present invention.

EXAMPLE 3 (variant [a])

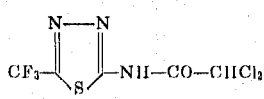

10.1 g. (0.1 mol) triethylamine are added to 16.9 g (0.1 mol) 2-amino-5-trifluoromethyl-1,3,4-thiadiazole in 100 ml tetrahydrofuran, and 14.7 g (0.1 mol) dichloroacetyl chloride are slowly added dropwise at 20°C. Stirring is continued for one hour. Suction filtration from the precipitated triethyl-amine hydrochloride is thence effected, and thereafter the filtrate is concentrated by evaporation and the residue is recrystallized from benzene. The 2-dichloroacetylamino-5-trifluoromethyl-1,3,4-thiadiazole thereby obtained melts at 176°C.

In analogous manner, the thiadiazoles of formula (I) above mentioned in Table 3 also prepared:

TABLE 3

| | R | R' | R'' | m.p. °C | b.p. °C |
|---|---|---|---|---|---|
| (4₃) | CF₃ | H | CH₃ | 231 | |
| (5₁) | CF₃ | H | CCl₃ | 120 | |
| (18₁) | CF₃ | H | OCH₂—CH₂—OCH₃ | 148 | |

These compounds may be designated:

4. 2-acetylamino-5-trifluoromethyl-1,3,4-thiadiazole
5. 2-trichloroacetylamino-5-trifluoromethyl-1,3,4-thiadiazole
6. 2-(1',2',3',3',3'-pentachloro-prop-1'-enylcarbonylamino-5-trifluoroemthyl-1,3,4-thiadiazole
7. 2-(N-methyl-N-dichloroacetyl-amino)-5-trifluoromethyl-1,3,4-thiadiazole
8. 2-(N-methyl-N-propionyl-amino)-5-trifluoromethyl-1,3,4-thiadiazole
3. 2-methoxycarbonylamino-5-trifluoromethyl-1,3,4-thiadiazole
9. 2-isopropoxycarbonylamino-5-trifluoromethyl-1,3,4-thiadiazole 10. 2-n-butoxycarbonylamino-5-trifluoromethyl-1,3,4-thiadiazole
11. 2-prop-2'-enyloxycarbonylamino-5-trifluoromethyl-1,3,4-thiadiazole
12. 2-prop-2'-ynyloxycarbonylamino-5-trifluoromethyl-1,3,4-thiadiazole
13. 2-phenoxycarbonylamino-5-trifluoromethyl-1,3,4-thiadiazole
14. 2-(N-methyl-N-methoxycarbonyl-amino)-5-trifluoromethyl-1,3,4-thiadiazole
15. 2-(N-methyl-N-phenoxycarbonyl-amino)-5-trifluoromethyl-1,3,4-thiadiazole
16. 2-(4'-methyl-butylcarbonyl-amino(-5-trifluoromethyl-1,3,4-thiadiazole 17. 2-(1'-methyl-vinylcarbonyl-amino(-5-trifluoromethyl-1,3,4-thiadiazole
18. 2-(2'-methoxy-ethoxycarbonylamino-5-trifluoromethyl-1,3,4-thiadiazole EXAMPLE 4 (variant [b])

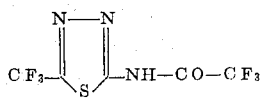 (19₁)

31.5 g (0.15 mol) trifluoroacetic anhydride are slowly added dropwise at 10°C to 16.9 g (0.1 mol) 2-amino-5-trifluoromethyl-1,3,4-thiadiazole. Stirring is continued for one hour at 20°C, and concentration in a vacuum is then effected. The crude 2-trifluoroacetylamino-5-trifluoromethyl-1,3,4-thiadiazole formed is recrystallized from benzene. m.p. 166°C.

In analogous manner, the thiadiazole of formula (I) above mentioned in Table 4 is also prepared:

TABLE 4

| | R | R' | R'' | m.p. °C | b.p. °C |
|---|---|---|---|---|---|
| (2₂) | CF₃ | H | CH₂·CH₃ | 177 | |

This compound may be designated:
2. 2-propionylamino-5-trifluoromethyl-1,3,4-thiadiazole It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with respect to warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention.

What is claimed is:
1. 2-(1',2',3',3',3'-Pentachloro-prop-1'-enylcarbonylamino)-5-trifluoromethyl-1,3,4-thiadiazole of the formula

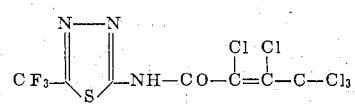

* * * * *